Aug. 6, 1968 A. N. SWEENY 3,395,496
SPADE DRILL GRINDING FIXTURE
Filed Dec. 30, 1964 2 Sheets-Sheet 1
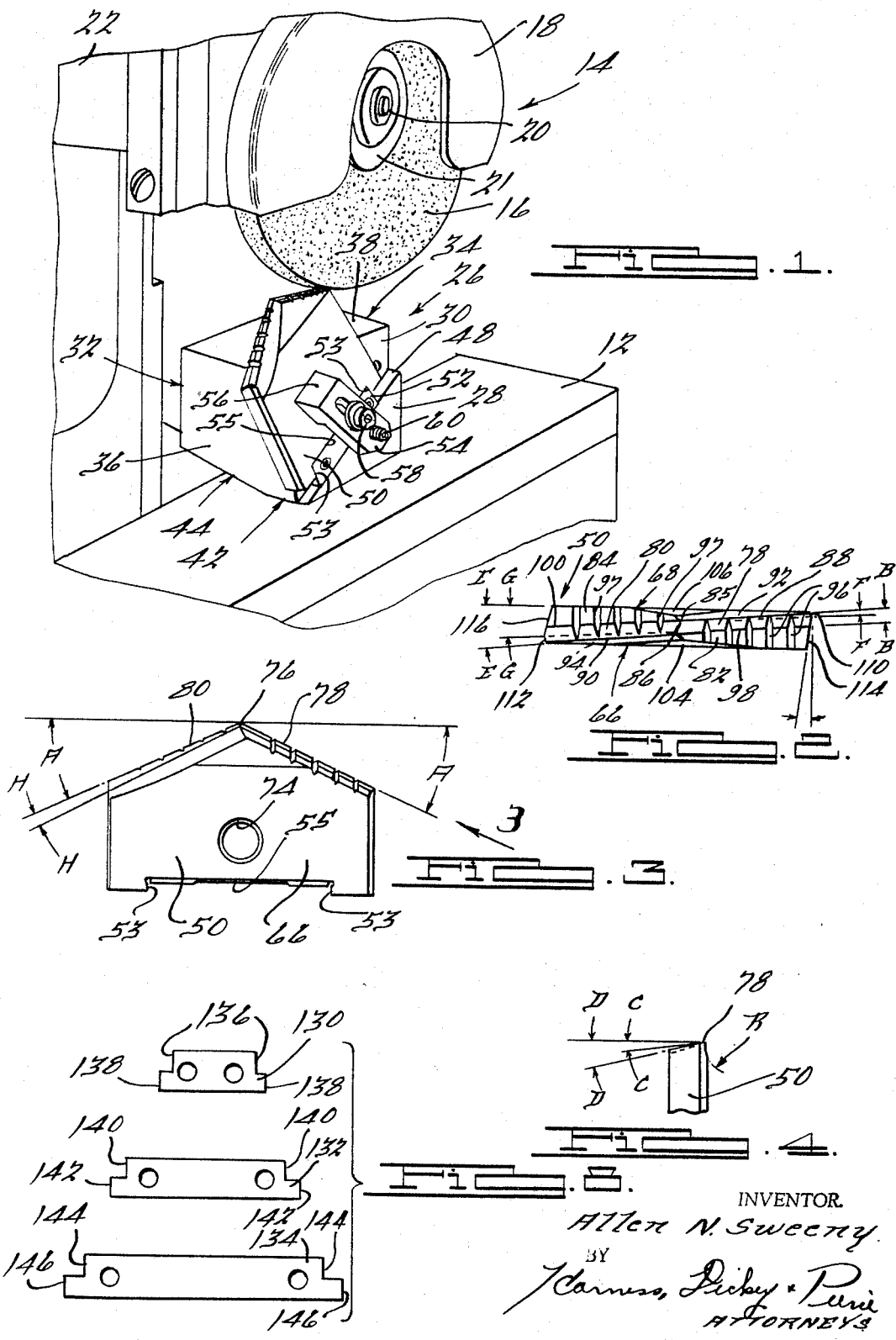
INVENTOR.
Allen N. Sweeny
BY
Carness, Dickey & Pierce
ATTORNEYS Aug. 6, 1968 A. N. SWEENY 3,395,496
SPADE DRILL GRINDING FIXTURE
Filed Dec. 30, 1964 2 Sheets-Sheet 2
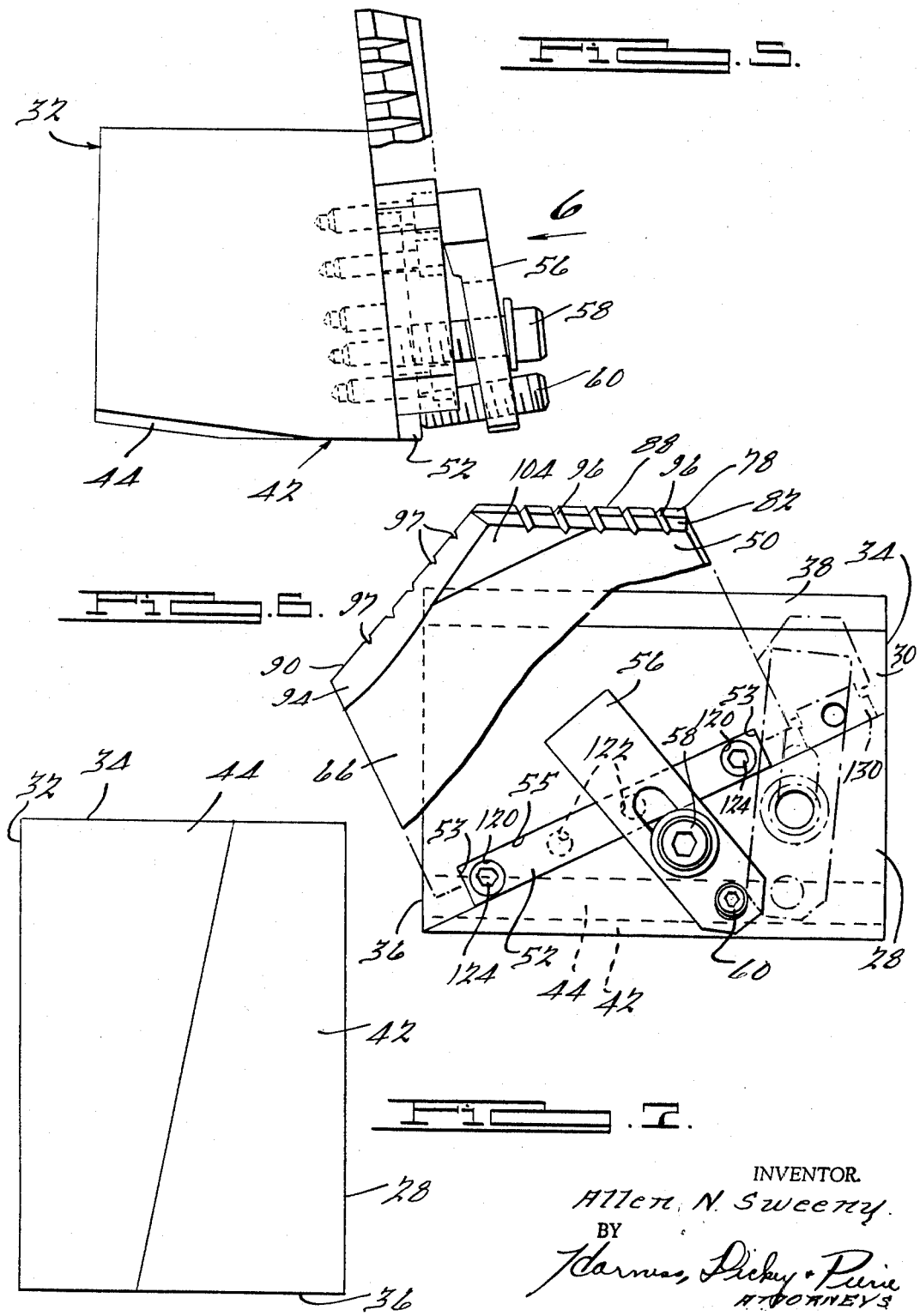
INVENTOR.
Allen N. Sweeny
BY
Harness, Dickey & Pierce
ATTORNEYS United States Patent Office 3,395,496
Patented Aug. 6, 1968

3,395,496
SPADE DRILL GRINDING FIXTURE
Allen N. Sweeny, Grosse Pointe, Mich., assignor to De Vlieg Machine Company, Royal Oak, Mich., a corporation of Michigan
Filed Dec. 30, 1964, Ser. No. 422,151
8 Claims. (Cl. 51—220)

ABSTRACT OF THE DISCLOSURE

A grinding fixture of the tumble block type, to position and hold a spade drill in a plurality of positions on a table grinder or dress the various working surfaces of the spade drill, the primary and secondary relief surfaces and the chip-breaking grooves all being ground in a direction parallel to the surface of the table.

This invention relates generally to a grinding fixture and more specifically to a grinding fixture of the tumble block type which is adapted to support a workpiece in a plurality of preselected angles relative to a work performing tool.

The grinding block of the present invention is particularly adaptable to be used in forming tools of the specific class which utilize generally straight elongated edges for cutting material from a solid workpiece, other surfaces or edges for removing the cut material and still other surfaces or edges for breaking up the material while it is being cut from the workpiece. Obviously these various edges and surfaces must be accurately finished to provide a tool that will perform the cutting operations necessary to obtain the tolerances required in certain finished products.

Typically, the various edges and surfaces outlined above are formed by a suitable wheel-type grinding machine. In the prior art methods and procedures, a large variety of grinding machines and tool holding jigs are required to perform the various grinding operations. These methods introduced inaccuracies due to the separate jigs and many handling and indexing operations required.

One such tool is in the class of drills known as the spade drill characterized by a plurality of pairs of symmetrical surfaces formed about the point of a flat piece of stock, the surfaces being located at various angles to the standard horizontal, vertical and profile planes of the tool. Some of these surfaces are flat, some are curved, and all require precision in their location and configuration for proper operation of the tool. In a typical spade drill there are a plurality of seven pairs of surfaces, some of these being symmetrical and three pairs of which will be more fully explained as the description proceeds in that it is these three pairs with which this particular invention deals. The seven pairs of surfaces are: the primary relief, secondary relief, chip curling and wedge surfaces, and a plurality of chip breaking grooves, all of which are arranged adjacent the point of the drill. The sides of the drill are formed with a pair of circular land surfaces and a pair of diameter relief surfaces, the land surfaces being utilized for guide purposes in the drilling operation.

As was stated above, many of the prior art jigs and methods of procedures require a large number of indexing and tumbling operations in order to perform the necessary grinding operations to produce a tool of the type described above. Certain of these methods require indexing of the tool, orientation of the tool by a surface thereof which is not normally used to orient the tool in use and excessive tumbling operations in grinding or forming the tool. Thus, many inaccuracies are introduced into the location and configuration of the surfaces of the tool due to the fact that many different reference surfaces of the various jigs are used to grind various surfaces of the tool. Also, the tool locating means on the jig is constantly being changed thus introducing further error due to the changing locating surface. As recited above, in the prior art jigs and methods, a different surface of the tool being produced is used for locating purposes rather than the surface which locates the tool in its actual operation, a situation tending to produce a tool which is disoriented in use.

Furthermore, in many prior art devices, the tool is supported in the fixture in a horizontal plane and the side of the grinding wheel is required to be used to perform the grinding operation. In this situation, severe vibrations may be set up due to the cantilever support of the tool and the transverse application of the grinding wheel against the face or surface which is desired to be ground. Thus, the surface may be inaccurately ground and a marred finish may be produced due to the vibration of the tool against the side face of the grinding wheel.

One method of minimizing this latter problem is to support the tool in the vertical position to perform the necessary grinding operations in the formation of the primary and secondary relief surfaces and the chip breaking grooves. In the use of the tumble block, the grinding wheel is advanced downwardly against the surface to be ground and the circumferential edge of the grinding wheel is used. In this manner the tool is not ground while in the horizontal position thus producing a cantilever effect and excessive vibration of the workpiece as was described above.

Accordingly, it is one object of the present invention to produce an improved type of grinding fixture.

It is another object of the present invention to provide a grinding fixture which is simple and easy to use.

It is another object of the present invention to reduce excessive vibration of the tool during the grinding operation.

It is still another object of the present invention to produce an improved grinding fixture having means thereon which locates the tool by means of the surface normally used to locate the tool in use.

It is still another object of the present invention to produce a grinding fixture which reduces the number of indexing operations of the fixture in order to perform the necessary grinding operations.

It is a further object of the present invention to produce a grinding fixture which supports the tool in a vertical plane in the grinding operations performed on the tool to form the working surfaces of the tool.

It is a further object of the present invention to produce a grinding fixture which is adapted to grind a uniform width primary relief surface.

It is still a further object of the present invention to produce a grinding fixture which has the inherent characteristic of producing the correct point angle and angles between the primary and secondary relief surfaces and between the pairs of primary relief surfaces and the point of the tool.

It is another object of the present invention to produce a grinding fixture which is formed to permit two pairs of grinding operations to be performed from the same reference surface.

It is still another object of the present invention to provide tool locating elements which may be fixed to the fixture and allow the operator to grind a large number of sizes of drills by merely changing the locating element.

It is still another object of the present invention to produce a grinding fixture which is inexpensive and simple to manufacture.

Other objects, features and advantages of the present invention will become apparent from the subsequent description taken in conjunction with the accompanying drawing in which:

FIGURE 1 is a perspective view of a grinding fixture embodying certain principles of the present invention as it would be positioned in actual operation on a grinding table;

FIGURE 2 is a top view of a typical spade-type drill which is adapted to be formed utilizing the grinding fixture of the present invention illustrating certain of the several angles formed by the various surfaces of the tool;

FIGURE 3 is a side view of the spade-type drill of FIGURE 2 illustrating other of the several angles formed by the various surfaces of the tool;

FIGURE 4 is an end view looking along the line of arrow 3 of FIGURE 3 illustrating still other angles of the tool;

FIGURE 5 is an end view of a preferred embodiment of the grinding fixture of the present invention illustrating the spade-type drill of FIGURES 2 to 4 as it is mounted in place on the grinding fixture, thus illustrating certain principles of the present invention;

FIGURE 6 is a front view of the grinding fixture of FIGURE 5 looking along line of sight of arrow 6 of FIGURE 5;

FIGURE 7 is a bottom view of the grinding fixture of FIGURES 5 and 6 illustrating the reference surfaces thereon; and FIGURE 8 illustrates a particular type of locating bars which are adapted for use on the grinding fixture of the present invention to enable the operator to grind various sizes of drills.

Referring now to the drawings, and particularly to FIGURE 1, wherein is illustrated a conventional grinding machine having a magnetic chuck 12 and a grinding wheel assembly 14. The grinding wheel assembly 14 is of the conventional type having a formed oxide grinding wheel 16 which is shielded for the safety of the operator by a shield member 18. The grinding wheel 16 is mounted for rotation relative to the magnetic chuck 12 by means of a shaft 20 and a fastener assembly 21, the shaft 20 being driven by a suitable motor (not shown) mounted on the frame 22.

The grinding wheel assembly 14 is mounted for vertical movement relative to magnet chuck 12 and the chuck 12 is transversely movable relative to the wheel, as is conventional in machines of this type. The magnetic chuck 12 is similarly mounted for longitudinal and transverse movement relative to the frame assembly 22 as is conventional, and magnetic chuck 12 is adapted to support an improved grinding fixture 26, which represents a preferred embodiment of the grinding fixture of the present invention. It is to be understood that magnetic chuck 12 may be selectively energized to rigidly fix the fixture 26 relative thereto.

The improved grinding fixture 26 comprises a prismoid shaped block 28 having a locating surface and a plurality of reference surfaces thereon. More specifically, the block 28 has a front surface 30 and a rear surface 32 which are intersected at right angles by a pair of end surfaces 34 and 36, and a top surface 38 also at right angles to ends 34, 36. The characteristic trapezoidal surfaces of the prismoid are formed at the base of block 28 and will be hereinafter referred to as a primary reference surface 42 and a secondary reference surface 44.

The front surface 30 has a ramp 48 formed thereon which is adapted to establish the proper angle between the axis of the tool and the grinding wheel as will be more fully explained hereinafter. A spade drill 50 which is desired to be ground or resurfaced is adapted to be mounted on the inclined surface 48 by means of a locating bar 52 and a clamp assembly 54. In this regard it is to be noted that the tool is located on fixture 28 by means of a pair of side surfaces 53 and a bottom surface 55 which are the surfaces normally used in locating the tool in use while being supported in a tool holder.

The tool retaining assembly 54 is formed of a retaining bar 56 which is adapted to be held against the tool 50 by means of a cap screw and washer arrangement 58 and a second cap screw 60. Thus as the tool is placed on the ramp 48 and positioned therein by means of locating bar 52, the retaining assembly 54 is again placed against the tool and the screws 58, 60 are then assembled into a hole provided in face 30 of the block 26. Thus the tool is positioned at the proper angle relative to the magnetic chuck 12 for proper grinding operation.

As will be seen as the description proceeds, the above described grinding fixture is particularly suited for producing or refinishing a workpiece of the spade drill type and enables an operator to duplicate the geometry or configuration of a spade drill with extreme accuracy and speed. In order to fully understand the operation of the grinding fixture and to appreciate the advantages obtained thereby, it is necessary to describe the specifics of a spade drill with particular emphasis on the surfaces which are symmetrical and contiguous to the point of the drill.

For this purpose, particular reference is directed to FIGURES 2 to 4 of the drawings, wherein is illustrated a typical space drill of the type which is suited for use on the grinding fixture of this invention. The spade drill 50 is formed of a piece of flat stock of extremely hard steel or other suitable material having a pair of flat sides 66 and 68 which are formed parallel to each other. The base of the drill 50 is formed with the pairs of shoulders 53 and the recessed bottom 55 which are adapted to locate the tool in a tool holder (not shown) for operation as described above. Normally, the drill is held in place by shoulders 53 and recess base 55 and an aperture 74 has been formed in the side of the drill 50 to receive a bolt or like fastening means which is used to retain the drill in the holder.

The working faces of the drill are symmetrical about a point 76 which is formed by the intersection of a pair of primary relief surfaces 78 and 80, and a pair of symmetrical secondary relief surfaces 82 and 84, respectively. The line formed by the intersection of the primary relief surface 78 and the secondary relief surface 82 and the primary relief surface 80 and the secondary relief surface 84 form a pair of straight lines, to be hereinafter described, which intersect the point 76 at spaced points to form a pair of subpoints 85, 86 which are associated with the opposite pairs of leading edges 88, 90 of primary relief surfaces 78, 80, respectively.

The leading edges 88 and 90 form the cutting edges of the drill and define angles A which are inclined a predetermined number of degrees relative to a plane perpendicular to the axis of the drill through the point 76. The operating area of the drill further includes a pair of diametrically opposed chip curling surfaces 92, 94 which are dished to form guides for the chips of stock as they curl off of the cutting edges 88 and 90. Two sets of chip breaking grooves 96, 97 are formed perpendicular to the longitudinal axis of each respective secondary relief surface 82, 84 and are adapted to break up the chips which curl off of the cutting edges 88 and 90.

Specifically, the cutting edges 88 and 90 are formed by the intersection of each respective chip curling surface 92, 94 with its respective primary relief surface 78, 80, thus forming a straight line from each respective subpoint 85, 86 of the point 76 to the edge of the drill. The other longitudinal edges 98, 100 of the primary relief surface 78, 80 is formed by the intersection of the primary relief surface 78, 80 with its respective secondary relief surface 82, 84. The formation of the secondary relief surface is so planned as to provide a uniform width throughout the complete longitudinal length of the primary relief surface, thus providing strength in the cutting edges 88 and 90. This width is shown between arrows B of FIGURE 2 and is of predetermined dimension according to the particular material from which the spade drill is fabricated. As is seen in FIGURE 4, the primary relief surface forms an angle C which gives the relief surface a predetermined inclination relative to a reference plane which goes through the cutting edges 88, 90 and is perpendicular to the sides 66 and 68. Also, the secondary relief surface forms a predetermined angle D relative to the same reference plane, that is, through cutting edges 88, 90 and perpendicular to sides 66 and 68.

As was stated above, the primary relief surfaces are of a uniform width extending from the cutting edges 88 and 90 to the pair of edges 98 and 100, the latter edges being defined by the juncture of the primary relief surfaces and the secondary relief surfaces. These edges 88, 90, 98, 100 are inclined at an angle relative to the sides 66 and 68 of the drill and define an angle E with respect thereto. Given a drill of a certain thickness, width, and wedge angle (to be hereinafter defined) there is only one angle E which will produce a primary relief surface having a constant transverse dimension across the entire width of the drill.

As was mentioned above, such constant width produces a drill of maximum strength and minimizes the possibility of chips breaking from the cutting edges 88 and 90 of the drill. The bottoms of the chip curling surfaces 92, 94 are angularly offset from the cutting edges 88 and 90 by an angle F defined in a horizontal plane, as best shown in FIGURE 2 and are also formed on a predetermined radius R as best illustrated in FIGURE 4. The bottoms of the chip curling surfaces 92, 94 also form an angle H with the cutting edges 88 and 90, as best shown in FIGURE 3. It is to be noted that the depth of the chip curling surfaces 88, 90 vary from a maximum at the outer edge or diameter of the drill to zero at the drill point 76. It is also to be noted that the angle E, as shown in FIGURE 2, less the angle F is equal to the angle G, which is the angle that the bottom or center line of the chip curling surfaces forms with sides 66 and 68.

The secondary relief surfaces 82 and 84 are contiguous to the primary relief surfaces 78 and 80 at one edge thereof, and the other edge of the secondary relief surfaces 82 and 84 is defined by the intersection with sides 66 and 68 along approximately half the length thereof and the other half of the length is defined by a pair of wedge surfaces 104 and 106 which are formed at an angle with each of its respective sides 66 or 68. The wedge surfaces 104 and 106 are forwardly convergingly inclined and the angle which they define with a plane through the sides 66 and 68 may be termed the "wedge angle." As was stated above, the secondary relief surfaces are inclined at an angle D to the plane including the point 78 and perpendicular to the sides 66 and 68, and it is to be noted that the angle D is greater than the inclination of the primary relief surface indicated as angle C relative to the same plane to which angle D is referenced. Thus the cutting edges 88, 90 are relieved by the primary relief surfaces to a certain extent and to a greater extent by the secondary relief surfaces.

The chip breaking grooves 96, 97 are formed in the primary and secondary relief surfaces and pass through the juncture of these two relief surfaces and are preferably formed perpendicular to the cutting edges 88 and 90. The chip breaking grooves 96, 97 are also designed to be formed parallel to the angle of inclination D of the secondary relief surfaces 82 and 84 and thus are of uniform depth through the secondary relief surfaces but are of varying depth through the primary relief surfaces. This is best illustrated in FIGURE 2 wherein it is seen that the depth of the groove through the secondary relief surfaces 82, 84 is of uniform width thereby indicating uniform depth and the grooves 96, 97 through the primary relief surfaces 78, 80 are of varying width thereby indicating varying depths.

The outer edges of the drill 50 are formed with two pairs of guiding surfaces, one pair of which are referred to as circular lands 110 and 112, which are relieved by a pair of diameter relief surfaces 114 and 116. The circular land surfaces 110 and 112 are formed on the drill by means of a rotating jig (not shown) and are curved in configuration, the radius of curvature being the radius of the drill body itself and the diameter relief surfaces are formed tapered at some predetermined angle to the sides 66 and 68 of the drill body. These circular lands and diameter relief surfaces are used for guiding the drill in its operation of drilling through a piece of solid stock.

When it is desired to form a spade drill, such as illustrated at 50, or to refinish a worn drill, the drill 50 is placed on the tumble block 26, as best illustrated in FIGURES 1, 5 and 6. This is accomplished by aligning a pair of countersunk holes 120 formed in bar 52 with a pair of a series of threaded holes 122 formed in surface 30 and attaching the bar 52 parallel to ramp 48 by means of a pair of screws 124. The spade drill 50 is then positioned on bar 52 with the shoulders 53 and bottom 55 thereof in contact with the sides and top, respectively, of the bar 52. The retaining bar 56 is then positioned and secured by screws 58 and 60 as explained above. Thus the drill 50 is secured to tumble block 26 at predetermined angles relative to the various surfaces of the tumble block 26.

To finish the primary relief surfaces 78 and 80, the tumble block is positioned so that the primary reference surface 42 is resting on the chuck 12 of the grinding apparatus. The magnetizing current is then applied and the tumble block is then rigidly fixed to chuck 12. With the tumble block resting on reference surface 42, angles A and C are automatically established between the surface 78 on the spade drill 50 which is parallel to the chuck 12, the primary relief surface, and reference planes which have been defined above with respect to angles A and C. Thus, the tumble block inherently establishes the proper orientation of the primary relief surface 78 by means of the transverse and backward tilt of primary reference surface 42 with respect to the vertical axis of the tumble block 26.

When it is desired to grind the secondary relief surface 82 the magnetizing current is shut off and the tumble block 26 is tumbled to a position whereby the secondary reference surface 44 is flat on the chuck 12. The current is again switched on and the tumble block 26 and drill 50 are rigidly fixed to the chuck 12. Thus the secondary relief surface 82 is properly oriented with respect to the drill 50 by resting tumble block 26 on surface 44 and the proper angles, such as angle A and D, are established between surface 82 and the reference planes which have been defined above with respect to angles A and D. In this manner the tumble block 26 inherently orients the spade drill 50 to form secondary relief surface by means of the orientation of surface 44 with respect to the tumble block.

As was explained above, the chip breaking grooves 96 are oriented in the same plane as is secondary relief surface 82 but perpendicular to the longitudinal dimension thereof. Thus, the chip breaking grooves 96 may be ground while tumble block 26 is resting on surface 44 by merely turning the tumble block 90° to the orientation illustrated in FIGURE 1. More specifically, the secondary relief surface 82 should be turned such that the longitudinal dimension thereof is perpendicular to the plane defined by the side of the grinding wheel 16. Also the grinding wheel 16 must be replaced with a wheel having a sharply defined circumferential edge with a predetermined angle of radial divergence from that edge toward the center of the drill. Thus the chip breaking grooves 96 may be ground by using the same reference surface 44 which was used to grind the secondary relief surface 82.

In order to grind the opposite side of the drill 50, that is, primary relief surface 80, secondary relief surface 84 and chip breaking grooves 97, it is only necessary to loosen the tool retaining bar 56 by means of screws 58 and 60 and turn the tool 50 over. In this manner, primary relief surface 80 will occupy the position formerly occupied by primary relief surface 78 and so forth. The procedure for grinding surfaces 78 and 82 and grooves 96 explained above is then repeated with respect to surfaces 80 and 84 and grooves 97.

Thus it is seen that only one tumbling operation is required to grind each side of the drill point 76 and the tool 50 is reoriented only once with respect to the tumble block 26 to grind the operating surfaces of the drill 50. This alleviates the many problems encountered in prior art devices requiring a plurality of tumbling operations for each side of the drill and further tumbling operations to grind the other side.

This invention is adapted to be used on many sizes of drills and a need has developed for various sizes of drill orienting bars such as the bars 130, 132 and 134 illustrated in FIGURE 8. Each of the bars 130, 132 and 134 is adapted to be used on two sizes of spade drills in that each bar 130, 132 and 134 has two parts of shoulders 136 and 138, 140 and 142, and 144 and 146, respectively. Thus, by choosing the orienting bar 130, 132 and 134 having the proper spacing of either top or bottom shoulders 136–146, any size drill 50 may be ground by merely orienting the proper retaining bar with respect to the threaded holes 122 formed in surface 30. FIGURE 6 illustrates bar 52 as described above and bar 130 as described in conjunction with FIGURE 8.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. A grinding fixture for grinding the working surfaces of a space drill including a primary and secondary relief surface, the spade drill being formed from generally flat stock having a front and back side and a pair of primary relief surfaces defining a plane forming an acute angle with the respective planes through the cutting edges and perpendicular to one of the sides and the secondary surfaces also forming an acute angle with the respective planes, the secondary acute angle being greater than the primary acute angle, the grinding fixture being cooperable with a table type surface grinder and comprising;

a tumble block having a plurality of surfaces thereon including, a front surface having means extending perpendicular thereto for orienting the spade drill at predetermined angles relative to said surfaces of said tumble block and the surface to be ground generally parallel to the table surface of the grinder, a first one of said surfaces being formed at a predetermined angle relative to the plane of said front surface for grinding and orienting the primary relief surface of the drill parallel to the table of the surface grinder, a second one of said surfaces being formed at another predetermined angle relative to the plane of said front surface for grinding and orienting the secondary relief surface of the drill parallel to the surface grinder, the plane defined by said first surface bearing substantially the same angular relation to said second surface as the primary relief surface bears to the secondary relief surface, and means fastened to said front surface for securing the drill on said front surface orienting means and against said front surface.

2. The grinding fixture of claim 1 wherein said front surfaces includes a shoulder portion formed thereon, said shoulder portion forming an inclined ramp relative to said front surface for orienting the spade drill at predetermined angles relative to said tumble block and the surface to be ground generally parallel to the table surface of the grinder.

3. The grinding fixture of claim 2 wherein said first surface intersects said front surface and said second surface intersects said first surface.

4. The grinding fixture of claim 2 wherein said last named means includes clamp means fastened to said front surface and engaging one side of the spade drill for securing the drill on said ramp and against said front surface.

5. The grinding fixture of claim 3 wherein said plurality of surfaces includes a pair of parallel side surfaces and a top surface intersecting said side surfaces at right angles thereto, a back surface intersecting said side and top surfaces at right angles thereto, said front surface intersects said top surface, a front surface intersecting said top surface and inclined at an angle relative to said back surface, said first and second ones of said surfaces being bottom surfaces and said last named means includes clamp means fastened to said front surface and engaging one side of the spade drill for securing the drill on said ramp and against said front surface.

6. A grinding fixture for grinding the working surfaces of a spade drill on a table type surface grinder comprising;

a tumble block having a plurality of surfaces thereon including, a front surface adapted to be oriented at a predetermined angle relative to the table of the surface grinder, a bottom surface formed at a predetermined angle relative to the plane of said front surface for orienting one of the working surfaces of the drill in a predetermined position relative to the table of the surface grinder, said front surface having a shoulder portion thereon forming an inclined ramp relative to said front surface for orienting the spade drill at a predetermined angle relative to said tumble block, said shoulder portion being integrally formed from said tumble block and partially defined by said front surface, and clamp means fastened to said front surface and engaging one side of the spade drill for securing the drill on said ramp and against said front surface including an orienting bar supported relative to said front surface having a pair of oppositely disposed shoulder portions, said pairs of shoulder portions being adapted to engage mating shoulder portions of a plurality of sizes of spade drills for rigidly supporting the spade drills relative to said tumble block, only one of said plurality of bars and sizes being supported by said tumble block at any one time and said bar supporting the working surface of each of said plurality of sizes at the same angle relative to said tumble block.

7. The grinding fixture of claim 6 wherein said plurality of surfaces includes a pair of parallel side surfaces and a top surface intersecting said side surfaces at right angles thereto, a back surface intersecting said side and top surfaces at right angles thereto, and said clamp means includes a T-shaped orienting bar supported relative to said front surface having a pair of oppositely disposed shoulder portions.

8. The grinding fixture of claim 7 wherein said front surface intersects said top surface and is inclined at an angle relative to said block surface, said T-shaped bar has a flat surface continguous with said front surface.

References Cited

UNITED STATES PATENTS

| | | | |
|---|---|---|---|
| 2,385,902 | 10/1945 | Wilson | 51—220 |
| 2,470,530 | 5/1949 | Stryhal | 51—220 |
| 2,626,491 | 1/1953 | Penkoff | 51—220 |
| 3,065,580 | 11/1962 | Benjamin | 51—220 |

HAROLD D. WHITEHEAD, *Primary Examiner.*